(No Model.)
T. A. EDISON.
MODE OF OPERATING DYNAMO ELECTRIC MACHINES.
No. 298,956. Patented May 20, 1884.
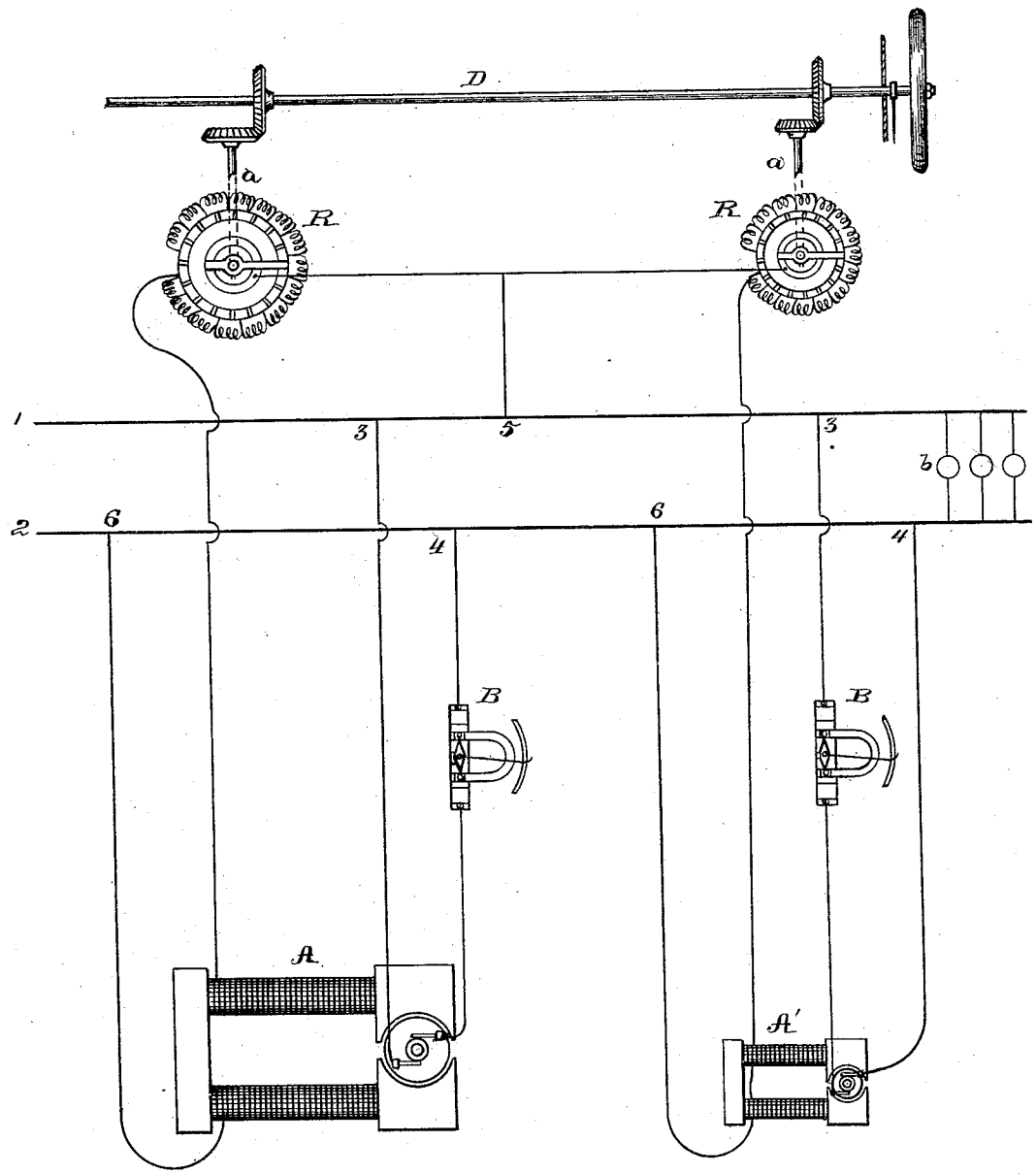
WITNESSES:
E. C. Rowland
INVENTOR:
Thomas A. Edison
By Rich. N. Dyer

UNITED STATES PATENT OFFICE.

THOMAS A. EDISON, OF MENLO PARK, NEW JERSEY.

MODE OF OPERATING DYNAMO-ELECTRIC MACHINES.

SPECIFICATION forming part of Letters Patent No. 298,956, dated May 20, 1884.

Application filed January 24, 1884. (No model.)

*To all whom it may concern:*

Be it known that I, THOMAS A. EDISON, of Menlo Park, in the county of Middlesex and State of New Jersey, have invented a new and useful Improvement in Dynamo-Electric Machines and Methods of Operating the Same, (Case No. 612,) of which the following is a specification.

This invention relates to systems of electrical distribution in which two or more electrical generators are connected in multiple arc to the same main conductors.

Heretofore it has not been found practicable to use together two generators having the same electro-motive force but of different generative capacity, for the reason that, as the current is proportional to the electro-motive force and resistance, the entire current generated tends to divide itself equally between the two machines, and the smaller machine having armature-coils of less radiating capacity is unequal to the work put upon it, and has its coils injured or burned out by the excessive current which traverses them. I have often found it necessary or convenient to use machines of different capacity in connection with the same circuit. For instance, in a plant of fifteen hundred incandescent lights it might be desired to use a one-thousand-light and a five-hundred-light machine to produce the necessary quantity of current, and in some plants I may wish to keep small machines as spare machines, which are thrown into circuit when an unusual load is put upon the generating-station. To provide for such instances as these I have devised a method of operation which allows the running of two unequal machines in multiple arc from the same circuit. I do this by regulating the electro-motive force of the machines until each machine gives its proper proportion of the entire current generated. I employ indicators of ampères of current, one for each machine, whereby I can determine what current each machine is giving, and I adjust the electro-motive force (which can be done in various ways) until the indicators show the right proportion for each machine. The machines are then regulated together and in the same proportion according to variations in the current required. Where the load is constant, of course no such regulation is necessary. The way in which I prefer to vary the electro-motive force of the machine is by adjusting resistances in their field-magnet circuits. The resistance for each machine has its coils proportioned to the generative capacity of the machine. I prefer to have the resistance-arms detachably connected together, so that they can be worked alone or simultaneously. When the machines are first placed in circuit, I disconnect the arms and adjust the resistances until the ampère-meters show the right proportions. I then reconnect the arms and adjust the resistances together according to variations in the load. The reduction of electro-motive force for the smaller machine may, however, be accomplished by running it at a somewhat lower speed than the other, or in any other suitable way. The small machine, running at lower electro-motive force, does less work than the larger in the proportion of their respective capacities. The commutator-brushes are kept adjusted to the point of least spark, as such point varies with the load upon the machine. It is evident that in some cases it may be desirable to regulate the electro-motive force of only one of two machines in order to properly proportion the two.

The accompanying drawing is a diagram illustrative of the invention.

A and A' represent two dynamo-electric machines of unequal generative capacity. Their armatures are connected in multiple-arc circuits 3 4 with the main conductors 1 2, and the field-magnets are placed in other circuits, 5 6.

B B are indicators of ampères of current. Any ampère-indicators may be employed—for instance, that set forth in my application No. 611, (Serial No. 118,543.) In each field-circuit is an adjustable resistance, R. The adjusting-arms are connected detachably with spindles *a a*, which are revolved by the shaft D. The resistances are disconnected and adjusted until the indicators B show the right proportion, and then, the resistance-coils being relatively proportioned, as shown, according to the capacity of the machines in connection with which they are used, they are connected again with the shaft and may be adjusted simultaneously if variations occur in the number of translating devices $b$ $b$ in circuit.

I do not claim herein the ampère-indicator in the armature-circuit of each machine, as this is claimed in my application No. 605, (Serial No. 114,283.)

What I claim is—

1. The combination of two machines of different generative capacity connected in multiple arc with the same circuit, and having their respective electro-motive forces adjusted as described, substantially as set forth.

2. The combination of dynamo-electric machines of different generative capacity connected in multiple arc with the same circuit, and means for regulating the electro-motive force of one or more or all of said machines, substantially as set forth.

3. The method of operating dynamo-electric machines of different generative capacity in multiple-arc connection with the same circuit, consisting in adjusting the electro-motive force of one or more or all of said machines until each gives its right proportion of the entire current, substantially as set forth.

4. The method of operating dynamo-electric machines of different generative capacity in multiple-arc connection with the same circuit, consisting in separately adjusting their electro-motive force until each gives its right proportion of the entire current, and then adjusting their electro-motive force simultaneously according to variations in the common load, substantially as set forth.

5. The combination of dynamo-electric machines of different generative capacity connected in multiple arc with the same circuit, and an adjustable resistance in the field-circuit of each, the coils of the resistances being proportioned to the machines, and said resistances being adjustable separately or simultaneously, substantially as set forth.

This specification signed and witnessed this 5th day of January, 1884.

THOS. A. EDISON.

Witnesses:
WM. H. MEADOWCROFT,
H. W. SEELY.